United States Patent
Hardy

[11] 3,881,365
[45] May 6, 1975

[54] GEARING

[75] Inventor: Alexander Hardy, 13565 Marion St., Detroit, Mich. 48239

[73] Assignee: General Motors Corporation, Detroit, Mich.

[22] Filed: Apr. 1, 1974

[21] Appl. No.: 456,844

[52] U.S. Cl. ................................................. 74/462
[51] Int. Cl. ........................................... F16h 55/06
[58] Field of Search ............................. 74/462, 459

[56] References Cited
UNITED STATES PATENTS

| | | | |
|---|---|---|---|
| 1,813,875 | 7/1931 | Fehr | 74/466 |
| 1,959,910 | 5/1934 | Fehr | 74/41 |
| 2,141,627 | 12/1938 | Street | 74/459.5 |
| 2,682,760 | 7/1954 | Shenk | 64/9 |
| 3,469,531 | 9/1969 | Wood | 418/206 |

*Primary Examiner*—Leonard H. Gerin
*Attorney, Agent, or Firm*—John P. Moran

[57] ABSTRACT

The purpose here is to provide the teeth of one of mating spur gears with a profile which results in the diminution of the operative noise level thereof. Specifically, the entering edge of each of the teeth of one of the gears is relieved in a manner which provides a ramp effect across the length thereof, causing each tooth to enter lightly or progressively, rather than all at once across its full length with an abrupt shock. For applications involving both directions of rotation, such relief results in substantially a frusto-conical shape for the gear, whereas, for applications having one direction of rotation, the relief is a tapered edge on one side of each tooth.

6 Claims, 3 Drawing Figures

GEARING

This invention relates generally to gearing and, more particularly, to spur gears.

During the operational meshing of conventional spur gears, contact between cooperating teeth to two adjacent spur gears is all at once across their respective full tooth-lengths due to their parallel teeth relationship, with the result that they tend to be relatively noisy in operation due to tooth imperfections or off-tolerances of various features thereof, such as the profiles, leads, and/or spacings.

Accordingly, it is an object of this invention to provide an improved spur gear by forming same with a profile which serves to reduce the noise results of the above-mentioned tooth imperfections.

Another object of this invention is to provide an improved profile for the teeth of one of a pair of meshing spur gears so as to eliminate the abrupt or "all-at-once" entry of each tooth thereof into an adjacent groove of another spur gear.

A further object of this invention is to provide an improved profile for the teeth of one of a pair of meshing spur gears so as to provide a ramp effect thereon which relieves the entering edge such that each tooth makes contact progressively across its full length, rather than abruptly thereacross.

Still another object of the invention is to provide the teeth of one of a pair of mating spur gears with a profile which produces a meshing action comparable to the "screw" effect of meshing helical gears.

A still further object of the invention is to form the exterior surface of one of two meshing spur gears so as to have a frusto-conical shape, thus providing the above-mentioned screw or ramp entry effects regardless of which operational directions the pair of spur gears are rotating.

Still another object of the invention is to form a tapered edge on one side of each tooth of one of a pair of meshing spur gears to provide the above-mentioned ramp effect for applications having one constant direction of rotation.

These and other objects and advantages of the invention will be apparent when reference is made to the following description and accompanying drawings, wherein.

Figure 1:
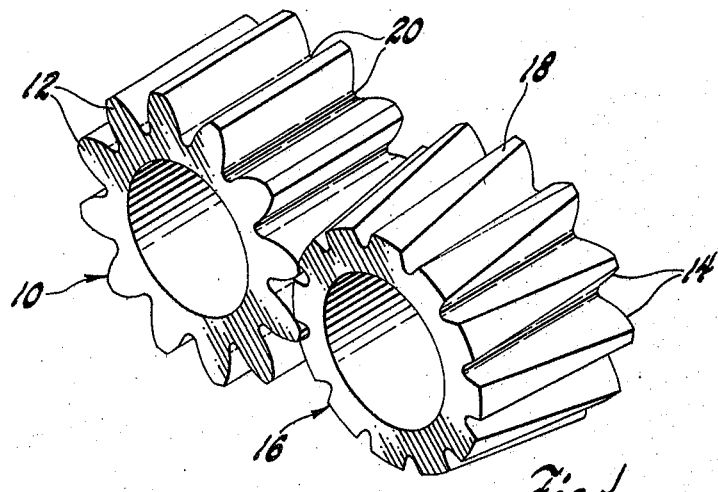
FIG. 1 is a perspective view of two meshing spur gears embodying the invention.

Referring now to the drawings in greater detail, FIG. 1 illustrates a gear 10 having conventional spur teeth 12 formed thereon and meshing with profiled teeth 14 of a second spur gear 16. The profiled teeth 14 have their O.D.'s or outer surfaces formed to include a taper 18, the latter serving to progressively vary the overall height of each tooth from one end thereof to the other, giving the gear 16 a substantially frusto-conical exterior shape. It may be noted that, by virtue of the taper 18, as each profiled tooth 14 enters an adjacent space or groove 20 of the gear 10, there occurs an initial entry at the high end of the profiled tooth 14, followed by a progressive contact across the length of the tooth 14, as the gears 10 and 16 continue to rotate. Thus a ramp-type meshing effect is accomplished, with the ramp gradually assuming the load, in contrast to the conventional "all-at-once" or abrupt entry of a typical spur tooth into the adjacent groove of a mating spur gear.

The gear set in FIG. 1 is designed for the condition that the gear 10 is always driving in a clockwise direction, i.e., the gear set is never subjected to a coast condition.

To supplement the above-described ramp-type load-assuming process, it has been found to be desirable to initially form each tooth 14 so as to have the entry end thereof slightly narrower than the other end, prior to the formation of the taper 18 thereon, in order to assure that the narrower end initially enters with a clearance, regardless of the manufacturing tolerances, with the ramp thereafter gradually assuming the load as described.

Figure 2:
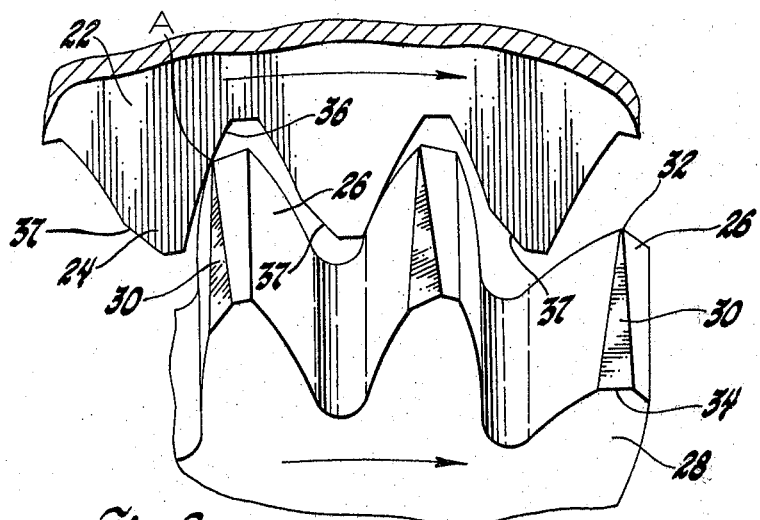
FIG. 2 is an enlarged fragmentary perspective view of an internal or ring gear and an associated external or pinion gear embodying a second form of the invention.

Referring now to FIG. 2, there is illustrated a ring gear 22 having conventional internal teeth 24 formed therearound, meshing with the externally formed teeth 26 of a spur gear 28, such as a pinion gear "walking around" the toothed inner surface of the ring gear 22. A tapered surface 30 is begun at a corner 32 of one end of each tooth 26 and formed progressively wider and deeper across the full length of each driving or trailing edge of each respective external tooth 26, terminating at the other end of each tooth 26 at a straight tapered edge 34. The degree of taper of the surface 30 is not to be excessive to the point of violating the accepted gear design practice of having a 1.2 involute contact ratio for assured continuity in tooth action at the effectively shallow end of the tooth. In other words, the leaving tooth retains the load until after the entering tooth assumes the load. The point of initial entry is the corner 32, illustrated by the letter A in FIG. 2, with respect to two clockwise rotating 22 and 28. In other words, in lieu of the usual parallel full tooth-length contact, a smooth and progressive entry of each tooth across the length thereof occurs by virtue of the formation thereon of the tapered surface 30. It should be clear that while FIG. 2 illustrates the meshing operation of cooperating ring and pinion gears, the features described therefor would apply to an arrangement wherein a spur gear is "walking along" a straight gear rack in lieu of the relatively large ring gear 22.

In the above description of the FIG. 2 arrangement, the internal or ring gear 22 was serving as the drive gear. Now, it should be realized that when the vehicle, whose transmission, for example, includes the FIG. 2 structure as part of a planetary gear arrangement thereof, is allowed to coast, it is the external or pinion gears 28 which become the drive gears during the coasting condition. Hence, in order to accomplish the same smooth mesh between the gears 22 and 28 during coasting as was described above, a taper 37 comparable to the taper 30 is formed on the trailing edge of each tooth 24 of the ring gear 22.

Figure 3:
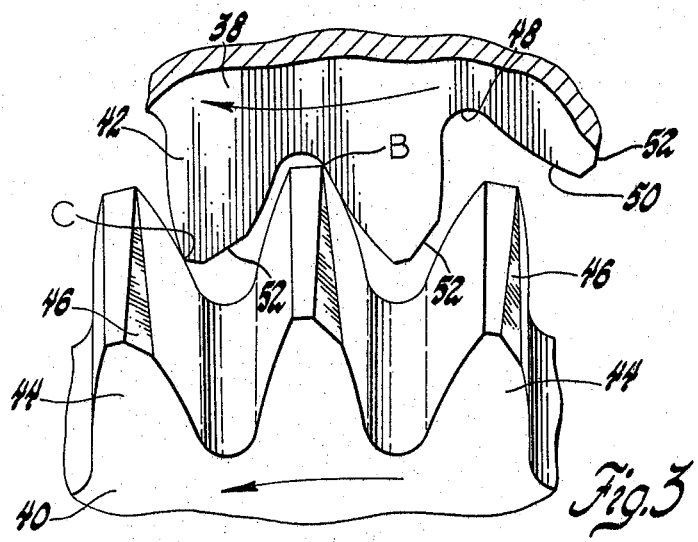
FIG. 3 illustrates a fragmentary perspective view of two companion external gears embodying the second form of the invention.

FIG. 3 illustrates the meshing operation of a pair of spur gears 38 and 40 having external teeth 42 and 44 respectively formed thereon. Such externally formed gears 38 and 40, for example, if included in a planetary gear arrangement, would be the pinion and sun gears, respectively. As in the case of FIG. 2, each tooth 44 of the spur gear 40 is formed to include a tapered surface 46 formed along the trailing edge thereof, such tapered surface 46 being comparable to the tapered surface 30 of the gear 28 of FIG. 2. In the case of these two meshing external gears 38 and 40, without the tapered surface 46, the initial gouging contact action would occur in the area represented by the letter B in FIG. 3, with respect to one clockwise and one counterclockwise rotating gear. That is, such gouging action occurs at the point of entry of respective tooth 44 of the counterclockwise rotating gear 40 into the adjacent space or groove 48 of the clockwise rotating gear 38, in contact with a side wall or profile 50 of a tooth 42 thereof. It is known that at the line of departure, represented by letter C in FIG. 3, the separating action between respective teeth 42 and 44 is smooth and needs no adjustment in the shape of the crown or side wall of either tooth 42 or 44.

In the foregoing description of the FIG. 3 arrangement, the spur or pinion gear 38 was the drive gear, whereas, in a coast situation, as was discussed above relative to FIG. 2, the spur or sun gear 42 becomes the drive gear. Accordingly, a taper 52 comparable to the taper 46 is formed on the trailing edge of each tooth 42 of each pinion gear 38 to accomplish the inventive smooth mesh of the teeth of a planetary gear arrangement during the coating phase of a vehicular operation.

As indicated above with respect to the FIG. 1 embodiment, the entry ends of the teeth 26 (FIG. 2), 44 (FIG. 3), 24 (FIG. 2), and 42 (FIG. 3), or, if preferred, both walls of the entry ends of the pinion gear teeth 26 and 42 only, are formed narrower than the respective other ends thereof, in order to assure that they enter adjacent spaces with a clearance, just prior to the ramp-type load-assuming process becoming effective. The narrower entry end serves to eliminate the usual "gouging" action which is known to normally occur at the point of initial contact of each tooth 26 of the external gear 28 against a wall or profile 36 of each adjacent tooth 24 of the internal gear 22.

At this time it may be realized that a particular planetary gear arrangement could consist of the ring gear 22 of FIG. 2, the sun gear 40 of FIG. 3, and either the pinion gears 28 or 38 of FIGS. 2 and 3, respectively.

It is to be realized that the tapers 30, 37, 46, and 52 are applicable where the directions of rotation are always in a constant direction, such as illustrated by the arrows shown for the respective gears 28, 22, 40, and 38. It should also be realized that the dual-edge taper 18 illustrated in FIG. 1 serves, in effect, to provide the equivalent of a single-edge taper 30 but, as indicated above, for gear sets which are never subjected to a coast condition.

It should be apparent that with the provision of the various tapers 18, 30, 37, 46, and 52, any tendency for an all-at-once or abrupt contact between the adjacent teeth of two conventional spur gears, due to normal imperfections, tolerance variations, such as might occur on the profiles, leads, and/or spacings of the various teeth of each gear, would be eliminated. In lieu thereof, the tapers 18, 30, and 46 serve to provide a ramp-entry effect, somewhat comparable to the threading action of meshing helical gears, thus eliminating any possibility of a shock-load during the meshing of respective adjacent teeth, and thereby substantially diminishing the resultant noise level in the Drive condition. Tapers 37 and 52 serve the same purpose in the coast condition.

It should be further apparent that the illustrations of the tapers 18, 30, 37, 46, and 52 have been greatly exaggerated in order to aid with the description thereof.

In actual practice, the tapers 30, 37, 46, and 52 may be generated involute profiles with a slightly higher pressure angle than that of the basic tooth profile, rather than flat surfaces.

While but two general embodiments of the invention have been shown and described, other modifications thereof are possible.

I claim:

1. A pair of meshing spur gears comprising a first conventionally formed spur gear and a second spur gear having a taper formed along at least one edge of the crown of each tooth thereof, said taper beginning at a tip of said crown at one end of each tooth and extending uniformly along the full length of said tooth to the other end thereof so as to progressively diminish the height of the contacting portion of the wall of said tooth, providing a tapered edge with respect to the axis of said second spur gear for progressively contacting an adjacent wall of a tooth of said first spur gear.

2. A pari of meshing spur gears comprising a first conventionally formed spur gear and a second spur gear having a taper formed along the crown of each tooth thereof, said taper beginning at an edge of said crown at one end of each tooth and extending uniformly along the full length of said tooth to the other end thereof so as to progressively diminish the contacting height of both walls of said tooth, providing a tapered edge along both sides of said each tooth for progressively contacting an adjacent wall of a tooth of said first spur gear regardless of which direction said first and second spur gears are rotating.

3. A pair of meshing spur gears comprising a conventionally formed internal spur gear and an external spur gear having a taper formed along the trailing edge of the crown of each tooth thereof, said taper beginning at a tip of said crown at one end of each tooth and extending uniformly along the full length of said tooth to the other end thereof so as to progressively diminish the height of the contacting portion of the wall of said tooth, providing a tapered edge with respect to the axis of said external spur gear for progressively contacting an adjacent wall of a tooth of said internal spur gear.

4. A pair of meshing spur gears comprising a conventionally formed spur gear rack and an external spur gear having a taper formed along at least one edge of the crown of each tooth thereof, said taper beginning at a tip of said crown at one end of each tooth and extending uniformly along the full length of said tooth to the other end thereof so as to progressively diminish the height of the contacting portion of the wall of said tooth, providing a tapered edge with respect to the axis of said external spur gear for progressively contacting an adjacent wall of a tooth of said spur gear rack.

5. A pair of meshing spur gears comprising a first conventionally formed external spur gear and a second external spur gear having a taper formed along at least one edge of the crown of each tooth thereof, said taper beginning at a tip of said crown at one end of each tooth and extending uniformly along the full length of said tooth to the other end thereof so as to progressively diminish the height of the contacting portion of the wall of said tooth, providing a tapered edge with respect to the axis of said second external spur gear for progressively contacting an adjacent wall of a tooth of said first external spur gear.

6. A pair of meshing spur gears comprising a first conventionally formed external spur gear and a second external spur gear having one end of each tooth thereof formed narrower than the other end thereof and having a taper formed along at least one edge of the crown of each tooth thereof, said taper beginning at a tip of said crown at said one end of each tooth and extending uniformly along the full length of said tooth to said other end thereof so as to progressively diminish the height of the contacting portion of the wall of said tooth and thus provide a tapered edge with respect to the axis of said second external spur gear for progressively contacting an adjacent wall of a tooth of said first external spur gear.

* * * * *